United States Patent [19]
Poe et al.

[11] 3,988,808
[45] Nov. 2, 1976

[54] READILY MOUNTED SEPARABLE FASTENER

[75] Inventors: L. Richard Poe; Clifford A. Davis; William R. Bourne, Jr., all of Placentia, Calif.

[73] Assignee: Hartwell Corporation, Placentia, Calif.

[22] Filed: Aug. 8, 1975

[21] Appl. No.: 603,132

[52] U.S. Cl. .................................. 24/73 P; 292/17
[51] Int. Cl.² ...................... E05C 7/00; A44B 21/00
[58] Field of Search ........... 24/73 P, 73 PF, 73 RM, 24/221 R; 151/41.75; 85/80, 82, 5 R; 292/17

[56]     References Cited
         UNITED STATES PATENTS

| | | | |
|---|---|---|---|
| 2,424,757 | 7/1947 | Klumpp | 151/41.75 UX |
| 2,788,047 | 4/1957 | Rapata | 85/80 |
| 2,826,388 | 3/1958 | Janos et al. | 24/73 RM UX |
| 2,946,612 | 7/1960 | Ahlgren | 85/80 X |
| 3,037,596 | 6/1962 | Fordyce | 85/5 R X |
| 3,327,581 | 6/1967 | Schlueter | 85/5 R |
| 3,776,580 | 12/1973 | Michael | 292/17 |

*Primary Examiner*—Donald A. Griffin
*Attorney, Agent, or Firm*—Lyon & Lyon

[57]     ABSTRACT

A separable fastener including a stud component and a latching sleeve component, the stud component being arranged for installation, in a sheet member having a rectangular opening, by limited insertion and rotation; the latching sleeve member being installed in a second sheet member, having a rectangular opening, by axial movement.

10 Claims, 11 Drawing Figures

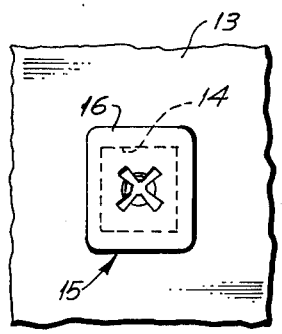
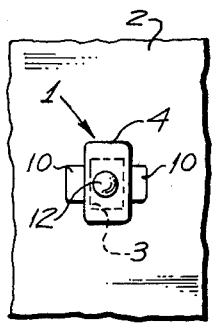
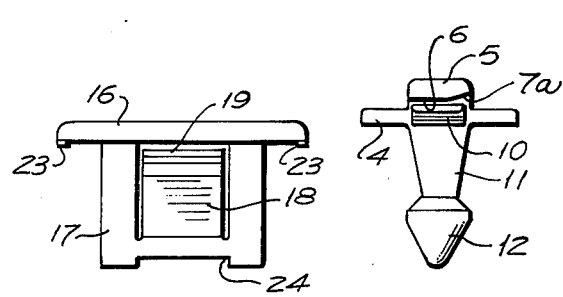
FIG. 1  FIG. 2  FIG. 3  FIG. 4
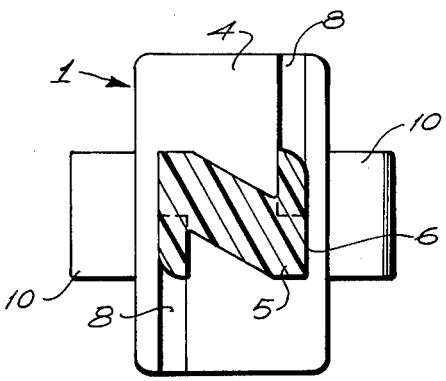
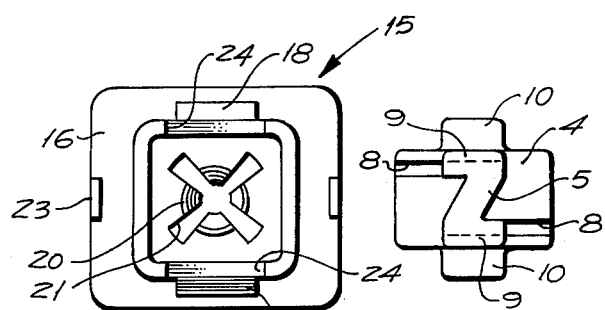
FIG. 9  FIG. 5  FIG. 6
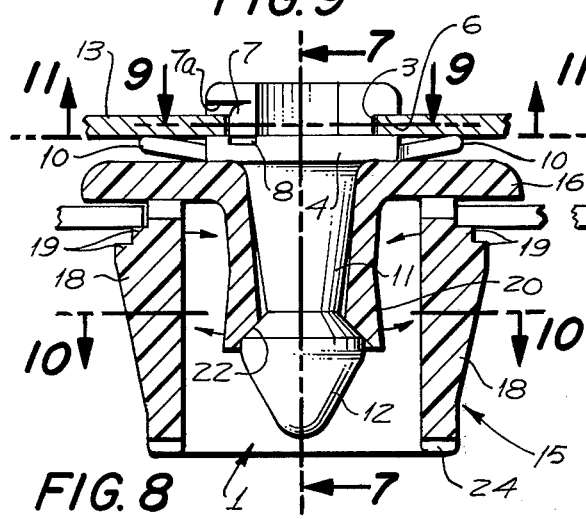
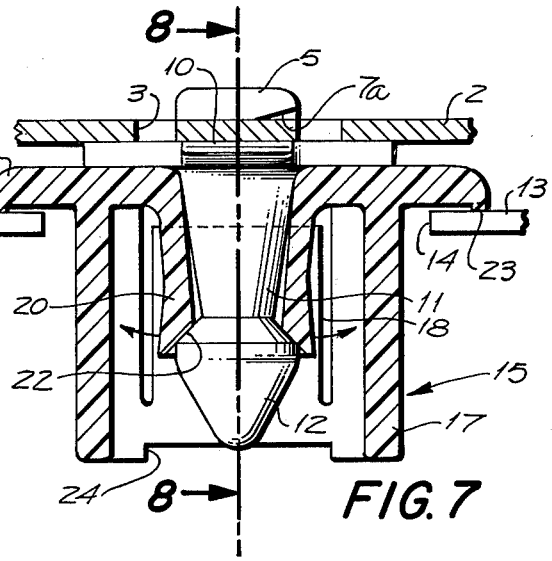
FIG. 8  FIG. 7
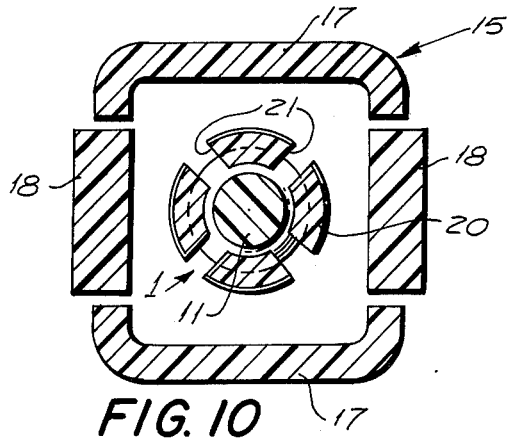
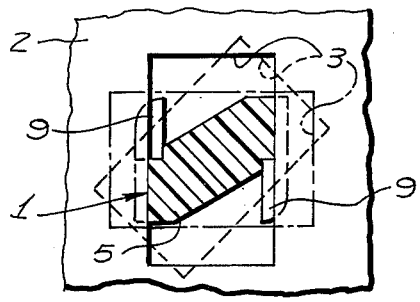
FIG. 10  FIG. 11

READILY MOUNTED SEPARABLE FASTENER

BACKGROUND AND SUMMARY

The present invention is directed to a readily mounted separable fastener which is a further development of the fastener disclosed in U.S. Pat. No. 3,776,580 and is summarized in the following objects:

First, to provide a readily mounted separable fastener having two components, a stud component and a latching sleeve component which utilize preformed rectangular openings in a pair of mounting members having mounting slots bordered by flat relatively thin margins.

Second, to provide a separable fastener, as indicated in the preceding object, wherein the latching sleeve member is joined to its mounting member without tools, and is provided with means which may be used, prior to mounting the latching sleeve member, as a tool to effect partial rotation of the stud member in order to secure the stud member to its mounting member.

Third, to provide a separable fastener, as indicated in the other objects, wherein either or both fastener components are capable of frictionally restrained lateral movement with respect to their mounting members whereby the components tend to be shifted into coaxial operating position upon initial mutual engagement, and tend to retain such position.

DESCRIPTION OF THE FIGURES

FIGS. 1 and 2 are opposed end views showing respectively the latching sleeve component and the stud component, comprising the separable fastener as they appear when mounted.

FIGS. 3 and 4 are enlarged side views of the two components.

FIGS. 5 and 6 are end views thereof, taken in a direction opposite from FIGS. 1 and 2.

FIG. 7 is a further enlarged view taken through 7—7 of FIG. 8, the stud component being shown in side elevation, the latching sleeve component in section.

FIG. 8 is a similar view taken through 8—8 of FIG. 7, also showing the stud component in elevation and the latching sleeve component in section.

FIG. 9 is a sectional view of the stud component taken through 9—9 of FIG. 8.

FIG. 10 is a transverse sectional view of the fastenr taken through 10—10 of FIG. 8.

FIG. 11 is a transverse sectional view of the stud component taken from 11—11 of FIG. 8 and indicating an outline, the opening which receives the stud component, the opening being shown in several positions to indicate the manner in which the stud component is secured.

DESCRIPTION OF THE PREFERRED EMBODIMENT

The stud component designated 1 is received on a mounting member 2 which may form a door or cabinet or the like. The mounting member 2 is provided with a rectangular slot 3, the margins of which are relatively thin and flat. The entire mounting member may be formed of sheet material, but not necessarily so.

The stud component 1 of the separable fastener is molded of high strength plastic material and includes a backing plate 4 dimensioned to cover the rectangular slot 3. Formed on the backside of the backing plate is a Z shaped boss 5 which is disposed transversely with respect to the backing plate. The opposite lateral extremities of the boss 5 form cantilever projections, each overlying a latching slot 6, one side of each slot being flush with the back surface of the backing plate 4, each slot includes a rounded or relieved corner 7, and beveled under surface 7a. The backside of the backing plate 4 is provided with a pair of shallow grooves 8 which extend part way under the parallel extensions 9 forming the extremities of the Z shaped boss.

The side edges of the backing plate in the region corresponding to the Z shaped boss 5 is provided with yieldable side tabs 10. The front side of the backing plate 4 is provided with a tapered shaft 11 which terminates in a head 12 having opposed bevelled surfaces.

Installation of the stud component 1 is as follows:

By reason of the grooves 8 the parallel extensions 9 form portions of the boss 5 but are severed from direct contact to the backing plate 4, this is represented in FIG. 11, taken in a plane contiguous to the backside of the backing plate.

The Z shaped boss 5 is inserted in the rectangular slot 3 whereupon the stud component 1 is forcibly rotated relative to the mounting member 2; however, for purposes of illustration in FIG. 11 the slot 3 of the mounting member is indicated as rotated. Initially the relative position of the stud component and the slot is such as indicated by broken lines representing the slot. Upon relative rotation opposite margins of the slot are moved forcibly under the extensions 9 through the dash line position of the slot until the margins of the slot are in the solid line position shown in FIG. 11.

The boss construction on the stud component 1 enables the stud to be readily and quickly mounted on the member 2 without the use of tools. Once the stud is mounted thereon it is not easily removed, however if it is desired to remove the stud component, the stud may be forced free of the mounting member. It will be noted that when once mounted the stud component 1 is capable of limited longitudinal movement and lesser side movement with respect to the slot 3 to assist in alignment with the latching sleeve member forming the other component of the separable fastener. As the stud component is intended to be mounted on members of different thicknesses, the yieldable side tabs 10 bear against opposite margins of the slot to hold the stud component in place.

A second mounting member 13 having a rectangular slot 14 is provided for the latching sleeve component 15 forming the other component of the separable fastener. The latching sleeve component is molded as a single piece from high strength plastic material. The latching sleeve mounting member may be a door or a panel frame or the functions of the two mounting members may be reversed, while the entire mounting members 13 may be formed of sheet material, it is only essential that that portion of the mounting member 13 forming the margins of the slot 14 be flat and relatively thin.

The latching sleeve member 15 is provided with a rectangular cover plate 16 from the backside of which extends a rectangular guard sleeve 17. Two opposed sides of the guard sleeve are provided with latching panels 18 having free ends confronting the cover plate 16. The cover plate confronting ends of the panel 18 are provided with a pair or more of latching shoulders 19.

Centered within the guard sleeve 17 is a stud latching sleeve 20 having longitudinal slits 21 to divide the latching sleeve 20 into four latching segments having beveled extremities 22.

The latching sleeve component 15 is readily attached to the mounting member 13 by pressing the guard sleeve 17 through the slot 14, causing the latching panels to pivot inwardly until the margins of the slot pass the latching shoulders 19. The proportions of the slot 14 are such that the slot has a width essentially equal to the width of the portion of the guard sleeve 17 provided with the latching panels 18, as shown in FIG. 8, however, the slot 14 has a greater length, as shown in FIG. 7, so that the latching sleeve component 15 is capable of limited lateral displacement.

The extremities of the cover plate 16 overlying the margins of the slot at the longitudinal extremities thereof may be provided with the friction lugs 23 which bear against the mounting member 13 and tend to hold the latching sleeve component 15 in place.

The extremity of the head 12 of the stud component is relatively pointed so that should the stud component 1 and the latching sleeve 20 be misaligned either or both the stud component and the latching sleeve component will be shifted into alignment by reason of the lateral movement permitted by both components.

It should be noted that the guard sleeve 17 not only functions to support the latching panels 18, but also serves to protect the segments of the stud latching sleeve 20 from damage as may occur when the components of the fastener are disengaged.

To install the stud member 1, the extremity of the guard sleeve 17 may be provided with opposed recesses 24 dimensioned to fit over the backing plate 4 of the stud member 1 so that the latching sleeve member 15 may be used as a tool to effect rotation of the stud member 1.

Having fully described our invention it is to be understood that we are not to be limited to the details herein set forth, but that our invention is of the full scope of the appended claims.

We claim:

1. A separable fastener the components of which are arranged for mounting in confrontable rectangular openings provided in thin wall portions of a pair of relatively movable members, said separable fastener comprising:
   a. a stud component including a base portion dimensioned to cover the rectangular opening provided in one of the relatively movable members, an opposing pair of yieldable side tabs, an opposing pair of yieldable latch elements in registery with the side tabs, the areas encompassed by the side tabs and latch elements being equal to each other and the area of the opening in the movable member and being movable between a position in registery with the opening and position at right angles thereto wherein the extremities of the side tabs and the extremities of the latch elements frictionally engage opposite surfaces of the movable member to retain the base portion in place; the stud component also including a stud projecting axially from the base portion;
   b. and a latching sleeve component dimensioned to overly and cover the opening provided in the other of said relatively movable members, and including means for attachment to margins of said opening and a latching sleeve arranged for removable attachment to said stud component.

2. A separable fastener, as defined in claim 1, wherein:
   a. said latching sleeve member includes a guard sleeve surrounding the latching sleeve, and opposite sides of the guard sleeve are provided with panels having radially movable extremities forming said attachment means.

3. A separable fastener, as defined in claim 1, wherein:
   a. at least one of said components is frictionally slidable laterally with respect to its corresponding opening to permit alignment with the mounting component.

4. A separable fastener as defined in claim 1, wherein:
   a. both components are adapted to be received in rectangular openings and are arranged for limited lateral displacement longitudinally therein.

5. A separable fastener as defined in claim 1, wherein:
   a. each component is removably received in its respective opening;
   b. and friction means is provided to resist removal.

6. A separable fastener the components of which are disposed on confrontable portions of a pair of relatively movable members at least one of which is provided with a component receiving opening, said separable fastener comprising:
   a. a latching sleeve component including a centrally disposed stud receiving sleeve having radial slits to form a set of radially expansible stud engaging fingers, a surrounding guard sleeve, and an opposed pair of laterally movable latching elements engageable with opposite margins of said opening to secure the latching sleeve component to the corresponding relatively movable member;
   b. and a stud component secured to the other relatively movable member in position for engagement with said fingers.

7. A separable fastener, as defined in claim 6, wherein:
   a. each of said relatively movable members is provided with a confrontable opening, and wherein;
   b. said stud component includes opposed laterally directed latching grooves for engaging opposed margins of the opening in said corresponding relatively movable member.

8. A separable fastener, as defined in claim 7, wherein:
   a. the latching sleeve component and stud components include mating portions whereby the latching sleeve component serves as a torquing means for turning the stud component into its secured position.

9. A separable fastener as defined in claim 6, wherein:
   a. said stud component includes a base portion dimensioned to cover an opening provided in the other relatively movable member, an opposing pair of latch elements projecting from the base portion for cooperation therewith to effect frictional engagement with opposing surfaces of the relatively movable member upon partial rotation of the base portion to provide a frictional engagement with the relatively movable member and retain the stud component thereon.

10. A separable fastener as defined in claim 6, wherein:
    a. the stud component includes a base portion and yieldable tab means extends laterally from the base portion for friction engagement with the corresponding relatively movable member to restrain separation of the stud component therefrom.

* * * * *